Patented June 29, 1937

2,085,151

UNITED STATES PATENT OFFICE 2,085,151

ALKALI ABIETATE COMPOSITIONS AND THEIR PRODUCTION

Edmund A. Georgi, Wilmington, Del., assignor to Hercules Powder Company, Wilmington, Del., a corporation of Delaware No Drawing. Original application April 17, 1931, Serial No. 531,002. Divided and this application June 13, 1934, Serial No. 730,473

9 Claims. (Cl. 260—108)

This invention relates to alkali abietate or resinate compositions and their production. More specifically, the compositions referred to consist of either alkali abietate of varying degree of purity or rosin sizes prepared in dry condition and being soluble in water, these sizes being either neutral or of any desired degree of acidity or alkalinity. The general process forming part of the invention is capable of variations in its details for the production of these various products.

Heretofore, various methods have been known for the production of acid salts of abietic acid, and neutral alkali abietates have been prepared. However, the acid salts of abietic acid are unsuitable for many commercial purposes, since they are almost insoluble in water, while the methods heretofore known for the production of neutral abietates present substantial difficulties and the product is objectionable since it is difficultly soluble in water and difficult to obtain in dry form.

The methods heretofore known for producing the acid salt of abietic acid involved, for example, the treatment of raw abietic acid with a quantity of alkali in solution sufficient to neutralize one-quarter of the abietic acid, followed by separation of the acid abietate formed (U. S. Patent No. 1,628,535). The acid salt of abietic acid thus formed is almost insoluble in water and hence does not lend itself to many commercial uses. By another method a major portion of the acid component of rosin is converted into alkali abietate and the salt produced treated for removal of the resene component of the rosin (U. S. Patent No. 1,663,764). The acid salt thus produced is almost insoluble in water and hence unusable for various commercial purposes.

Neutral alkali abietate has been produced by neutralizing abietic acid (rosin) with sodium carbonate or sodium hydroxide in equivalent quantities in aqueous solution. The aqueous solution of the neutral abietate produced, when concentrated, is a gelatinous, pasty, sticky mass, which is extremely difficult to handle and difficult to dry.

In brief, these prior processes were unsuitable for the production of either alkali abietate of high quality, by reason of the difficulty in removing resenes, etc., or the preparation of soluble size which could be obtained in dry condition so as to be capable of shipment in bags.

By suitable variations of the improved process, alkali abietate of a high degree of purity may be obtained from wood rosin, such abietates being substantially free from resenes and therefore suitable for the production of high grade soaps or varnishes or for use as sizing agents.

Alternatively, the improved process may be conducted for the preparation of sizes from wood rosin, such sizes being obtained in the form of porous free-flowing granules, readily and completely soluble in water, and non-hygroscopic so as to be adapted to shipment in bags as compared with barrels, with a saving in tare weight. These sizes, which may contain resenes, and may be readily formed with controlled degrees of acidity or alkalinity, are adapted for the common uses of rosin sizes.

Broadly, the process in accordance with the invention is carried out by treatment with an alkali of abietic acid or wood rosin in solution in a solvent which is a non-solvent for the alkali abietate produced. The treatment may be effected by adding to the rosin or abietic acid solution the alkali either in solution, suspension or dry form in suitable amount, the separation of abietate then being performed to obtain the desired product.

In one method of carrying out the process, abietic acid, as such, or a rosin containing abietic acid, for example, gum or wood rosin, may be dissolved in a suitable solvent such as a petroleum hydrocarbon (gasoline, naphtha, or the like), an aliphatic alcohol, (ethyl, methyl, denatured alcohol, etc.), acetone, carbon tetrachloride, etc. To this solution alkali is added, in the present example, in solution in a suitable solvent such as alcohol or water. The alkali may be chosen in accordance with the abietate desired and may, for example, be the hydroxide or carbonate of sodium, potassium or ammonium, or ammonia gas may be passed into the rosin solution. Alternatively, of course, mixtures of alkalies might be used. In the appended claims where one alkali of the general type referred to above is mentioned, it will be understood that the others are intended to be included as equivalents.

In the preceding paragraph the use of solvents for the alkali such as alcohol or water have been mentioned. It is found, however, that the mechanism of the process differs to some extent in accordance with the solvent used. For example, if an alcoholic solution of an alkali is used then the abietate or resinate immediately precipitates in granular form and may be readily separated from the solution by filtration and freed from rosin solvent by centrifuging or evaporation. In this case the abietate separates in quite pure form, the resenes and other impurities remaining in the mother liquor. By a suitable proportioning of the amount of alkali to the abietic acid in the rosin it will be obvious that a neutral alkali abietate of high quality may be produced. Prior to treating by centrifuging or evaporation of the solvent the crystalline abietate may be washed free from residual mother liquor by additional quantities of the rosin solvent or other liquid.

In the case where water is used, however, preferably being used in a minimum quantity necessary to attain solution of the alkali, which, of course, in most cases will require only a very small quantity of water, the abietate is not immediately precipitated but rather the whole mass, upon agitation to insure admixture, becomes gelatinous in character. In this case it is necessary to partially evaporate the mixture whereupon, probably after the loss of the water, the crystals of alkali resinate or abietate separate. In this case also by proper manipulation an abietate of a high degree of purity may be obtained.

In view of the fact that the production of a gelatinous mass is desirably avoided, it is preferable to avoid the use of water as a solvent. On the other hand, if alcohol is to be preferred, it may happen that the most economical alkali, for example, sodium carbonate, will be insoluble therein. In this case the rosin solution may be treated with a suspension of the alkali in a suitable medium, such as ethyl alcohol or gasoline, or other liquid, which may be the same as that used to dissolve the rosin. In the case of the use of ethyl alhocol, for example, the suspension may be formed by dissolving sodium carbonate in a small amount of water and adding ethyl alcohol, whereupon it is precipitated in fine form and remains in suspension, this suspension being then added to and agitated with the rosin solution. Of course, the alkali in finely divided form may be suspended in gasoline or other medium in which it does not dissolve and which is non-miscible with water. In the use of a suspension of this type crystallization and separation of the abietate or resinate will, in general, immediately take place so that separation may be effected as pointed out above. However, the addition of alkali in solution is preferable inasmuch as when a suspension of alkali is used it is frequently found that particles of abietate are formed having alkaline cores so that while the proportions of alkali to rosin may be so adjusted as to theoretically produce a neutral abietate nevertheless the final product when dissolved will show a slight alkalinity by reason of the free alkali contained therein.

Alternatively to all of the above methods the alkali in powdered form may be added directly to the rosin or abietic acid solution with suitable agitation. In this case again the abietate is immediately formed. However, there is a still greater tendency towards the inclusion of free alkali in the resulting product.

In the various methods outlined above the result has been the production of alkali abietate in rather pure form; that is, free from resenes or the like, by reason of the process of separation which is used. Instead of removing the crystals directly as outlined above so that the impurities remain in the mother liquor, the entire reaction mixture may be evaporated to dryness, in which case the product will be of impure form carrying not only abietate but resenes and other impurities. The resulting product is rosin size adapted for all of the uses to which rosin sizes have heretofore been put. The product is, however, readily produced so as to be either neutral or of any desired degree of alkalinity or acidity in view of the ready control of the proportion of alkali to rosin originally used. Preferably the process is so carried out when rosin size is to be produced that the product is neutral.

The rosin size, upon evaporation of the original rosin solvent or other liquids present, is found to be in the form of a free-flowing powder readily soluble in water with the formation of a clear solution. It is further more non-hygroscopic and lends itself admirably to various commercial uses, as in the making of paper size, soaps, emulsions, etc. The product, in view of its relatively non-hygroscopic nature, may be shipped in bags or other cheap containers. The product, which is in every way capable of replacing concentrated solutions of rosin size heretofore used, may be shipped at a conceivable saving due to the absence of the 20–50% of water contained in the concentrated solutions heretofore provided.

The admixture of the rosin solution and alkali preferably takes place at an elevated temperature of the order of 100° C. in order to accelerate the rate of reaction. Alternatively, the mixture may be made at ordinary temperatures, the temperature then being raised. In view of the fact that heat is to be applied later on to evaporate the liquids from the product, advantage may be economically taken of the elevated temperature in the manner just indicated to promote the rate of reaction.

As illustrative of one economical method of practicing the invention, there may be added to 300 grams of a 10% solution of wood rosin or gum rosin in gasoline 5.3 grams of sodium carbonate either in dry form, in suspension in 50 cc. of gasoline, or in 50% water solution. After the addition of the alkali to the rosin solution, the solution is agitated in order to effect intimate contact between the rosin in solution and the alkali. The neutral sodium abietate formed will precipitate from the solution in granular form and when the abietic acid content of the solution has been completely neutralized the granular abietate is separated therefrom by filtration and treated by the application of heat to evaporate the gasoline carried by the crystals.

From the above it will be obvious that the process is particularly well adapted for the preparation of alkali abietate of a high degree of purity from wood rosin inasmuch as the abietate which is precipitated is substantially free from color bodies and also from resenes and other impurities which would tend to produce the discoloration of soap made therefrom and affect its quality. In the event of the production of either the purified abietate or merely dry size, it may be pointed out that the process is such as to effectively produce a neutral dry size soluble in water.

It will be understood that in the above specification the "alkalis" referred to are alkali metal compounds or ammonia, and that the term "alkali" consequently is not intended to include, and does not include, any alkaline earth metal compounds. The "alkali abietates" described in the specification are accordingly alkali metal abietates and ammonium abietate, and the expression "alkali abietates" hence does not include alkaline earth metal abietates.

This application is a division of the application filed by me April 17, 1931, Serial No. 531,002.

What I claim and desire to protect by Letters Patent is:

1. The method of producing a neutral alkali metal abietate in substantially pure crystalline form which includes adding an alkali of the alkali metal group in suspension in a liquid vehicle to a solution of abietic acid in a solvent therefor which is non-solvent of the alkali and of the alkali metal abietate, the alkali being added in amount sufficient to substantially neutralize the abietic acid present, whereby crystalline neutral alkali metal abietate is precipitated from said solution, and separating said crystalline neutral alkali metal abietate free from impurities from the solution.

2. The method of producing a neutral alkali metal abietate in substantially pure crystalline form which includes adding an alkali of the alkali metal group in suspension in a liquid vehicle to a solution of abietic acid in a solvent therefor which is miscible with said vehicle and non-solvent of the alkali and of the alkali metal abietate, the alkali being added in amount sufficient to substantially neutralize the abietic acid present, whereby crystalline neutral alkali metal abietate is precipitated from said solution, and separating said crystalline neutral alkali metal abietate free from impurities from the solution.

3. The method of producing a neutral alkali metal abietate in substantially pure crystalline form which includes adding an alkali of the alkali metal group in suspension in a liquid vehicle to a solution of rosin in a solvent therefor which is non-solvent of the alkali and of the alkali metal abietate, the alkali being added in amount sufficient to substantially neutralize the abietic acid present, whereby crystalline neutral alkali metal abietate is precipitated from said solution, and separating said crystalline neutral alkali metal abietate free from impurities from the solution.

4. The method of producing a neutral alkali metal abietate in substantially pure crystalline form which includes adding an alkali metal hydroxide in suspension in a liquid vehicle to a solution of abietic acid in a solvent therefor which is non-solvent of the alkali metal hydroxide and of the alkali metal abietate, the alkali metal hydroxide being added in amount sufficient to substantially neutralize the abietic acid present, whereby crystalline neutral alkali metal abietate is precipitated from said solution, and separating said crystalline neutral alkali metal abietate free from impurities from the solution.

5. The method of producing a neutral alkali metal abietate in substantially pure crystalline form which includes adding an alkali metal carbonate in suspension in a liquid vehicle to a solution of abietic acid in a solvent therefor which is non-solvent of the alkali metal carbonate and of the alkali metal abietate, the alkali metal carbonate being added in amount sufficient to substantially neutralize the abietic acid present, whereby crystalline neutral alkali metal abietate is precipitated from said solution, and separating said crystalline neutral alkali metal abietate free from impurities from the solution.

6. The method of producing a neutral alkali metal abietate in substantially pure crystalline form which includes adding to a solution of abietic acid in a petroleum hydrocarbon solvent an alkali of the alkali metal group in suspension in a liquid vehicle miscible with said solvent and in amount sufficient to substantially neutralize the abietic acid present, whereby crystalline neutral alkali metal abietate is precipitated from said solution, and separating said crystalline neutral alkali metal abietate free from impurities from the solution.

7. The method of producing a neutral alkali metal abietate in substantially pure crystalline form which includes adding to a solution of rosin in a petroleum hydrocarbon solvent an alkali of the alkali metal group in suspension in a liquid vehicle miscible with said solvent and in amount sufficient to substantially neutralize the abietic acid present, whereby crystalline neutral alkali metal abietate is precipitated from said solution, and separating said crystalline neutral alkali metal abietate free from impurities from the solution.

8. The method of producing a neutral alkali metal abietate in substantially pure crystalline form which includes adding to a solution of abietic acid in a petroleum hydrocarbon solvent an alkali metal hydroxide in suspension in a liquid vehicle miscible with said solvent and in amount sufficient to substantially neutralize the abietic acid present, whereby crystalline neutral alkali metal abietate is precipitated from said solution, and separating said crystalline neutral alkali metal abietate free from impurities from the solution.

9. The method of producing a neutral alkali metal abietate in substantially pure crystalline form which includes adding to a solution of abietic acid in a petroleum hydrocarbon solvent an alkali metal carbonate in suspension in a liquid vehicle miscible with said solvent and in amount sufficient to substantially neutralize the abietic acid present, whereby crystalline neutral alkali metal abietate is precipitated from said solution, and separating said crystalline neutral alkali metal abietate free from impurities from the solution.

EDMUND A. GEORGI.